United States Patent
Sherman

(10) Patent No.: US 7,909,253 B2
(45) Date of Patent: Mar. 22, 2011

(54) IMAGE DETECTION SYSTEM AND METHODS

(75) Inventor: Neil Z. Sherman, Fairfax Station, VA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 602 days.

(21) Appl. No.: 11/753,239

(22) Filed: May 24, 2007

(65) Prior Publication Data

US 2009/0283598 A1 Nov. 19, 2009

(51) Int. Cl.
*G01C 3/00* (2006.01)

(52) U.S. Cl. ............... 235/454; 42/114; 42/115

(58) Field of Classification Search .......... 235/454, 235/474, 462.2, 404, 407; 250/203.1, 203.2, 250/580, 559.05, 559.3; 434/14, 17, 21, 434/22; 244/3.1; 342/52, 54; 396/106, 147; 348/221.1, 135–141
See application file for complete search history.

(56) References Cited

U.S. PATENT DOCUMENTS

| | | | | |
|---|---|---|---|---|
| 6,323,941 B1 * | 11/2001 | Evans et al. | | 356/4.01 |
| 6,587,191 B2 * | 7/2003 | Greenfield et al. | | 356/139.07 |
| 7,376,244 B2 * | 5/2008 | Baer | | 382/103 |
| 2003/0085339 A1 * | 5/2003 | Janesick | | 250/208.1 |
| 2003/0158470 A1 * | 8/2003 | Wolters et al. | | 600/317 |
| 2003/0174315 A1 * | 9/2003 | Byren et al. | | 356/152.1 |
| 2003/0210345 A1 * | 11/2003 | Nakamura et al. | | 348/362 |
| 2004/0233420 A1 * | 11/2004 | Deflumere et al. | | 356/139.03 |
| 2005/0243411 A1 * | 11/2005 | Cook | | 359/363 |
| 2006/0054782 A1 * | 3/2006 | Olsen et al. | | 250/208.1 |
| 2007/0076213 A1 | 4/2007 | Kato | | |
| 2007/0081161 A1 | 4/2007 | Matsumoto | | |
| 2007/0084927 A1 | 4/2007 | Itou et al. | | |

FOREIGN PATENT DOCUMENTS

EP 770884 A1 * 5/1997

OTHER PUBLICATIONS

EP 770884 A1, Soucail et al., May 1997, Machine Translation.*

* cited by examiner

*Primary Examiner* — Daniel A Hess
(74) *Attorney, Agent, or Firm* — Tarolli, Sundheim, Covell & Tummino LLP

(57) ABSTRACT

An image detections system comprising an image detection system configured to detect images. The system also comprises a controller that synchronizes the image detection system to capture a reflected laser beam over a first integration time and to capture an environment image detected by the image detection system over a second integration time that is greater than the first integration time.

15 Claims, 6 Drawing Sheets

IMAGE DETECTION SYSTEM AND METHODS

TECHNICAL FIELD

The present invention relates generally to imaging, and more particularly to an image detection system and methods.

BACKGROUND

In modern military applications, often laser guided munitions (e.g., laser guided artillery, laser guided missiles, laser guided bombs, etc.) are employed. The laser guided munitions can be designed such that when laser guided munitions are activated (e.g., fired) a controller and/or a sensor in the laser guided munitions tracks the location of a targeting laser spot and causes the laser guided munitions to move toward the targeting laser spot whether the target be stationary or moving.

Conventionally, the targeting laser is aligned with the target identifier such that when the target identifier is aligned on a target so is the targeting laser spot. However, difficulties exist for aligning the targeting laser with the targeting identifier. In most imaging systems, the spectral bandwidth of the imager is too narrow to detect both, an image of the target and the laser. For those systems where the spectral bandwidth of the imager might allow imaging the laser, interference caused by ambient light prevents an accurate detection of the laser when detecting an image of the target.

Accordingly, the alignment (of the imager and the laser) is often performed in a closed environment (e.g., a manufacturing facility or with an external instrument) using alignment structures. However, when the targeting system is mounted on a mobile unit (e.g., an aircraft, a boat, a vehicle, etc.) vibrations experienced by the targeting system during movement of the mobile unit, as well as changing temperatures of the environment can cause the laser and the imager to become misaligned.

SUMMARY

One aspect of the invention relates to an image detections system comprising an image detection system configured to detect images. The system also comprises a controller that synchronizes the image detection system to capture the reflected laser beam over a first integration time and to capture an environment image detected by the image detection system over a second integration time that is greater than the first integration time.

Another aspect of the invention relates to a system for detecting an image, the system comprising means for detecting images. The system also comprises means for capturing the detected image. The system further comprises means for setting an integration time of the means for detecting images, such that a laser beam image is captured by the means for capturing after a first integration time and an environment image is captured after a second integration time that is greater than the first integration time. The system still further comprises means for superimposing the laser beam image onto the environment image to form a superimposed image.

Yet another aspect of the invention is related to a method for detecting an image. The method comprises providing a light beam from a laser. The method also comprises detecting an image of an environment with an imager set to a first integration time. The method further comprises detecting an image of the light beam with the imager set to a second integration time. The method still further comprises superimposing at least a portion of the image of the light beam onto the image of the environment to form a superimposed image.

DETAILED DESCRIPTION

In the present invention, an imager detects a series of images at a given frame rate. An integration time is the length of time that an image is exposed (e.g., photons are collected) by the imager for each image. In the present invention, the integration time of the imager is varied significantly (e.g., from about 10 milliseconds to about 50 microseconds) for alternating detected images. Certain images are better detected with specific integration times. As an example, a laser beam will be more easily detected with a very short integration time (e.g., about 50 microseconds), while a thermal image of an environment will be more accurately detected with a longer integration time (e.g., about 10 milliseconds). This is mainly due to the amount of photons that will be collected by the imager from ambient light.

In the present invention, each image that is taken with a shorter integration time (e.g., about 50 microseconds) is superimposed onto a preceding or proceeding image taken with a longer integration time (e.g., about 10 milliseconds) to form a composite image. The composite image can be used, for example, to align a laser system.

Figure 1:
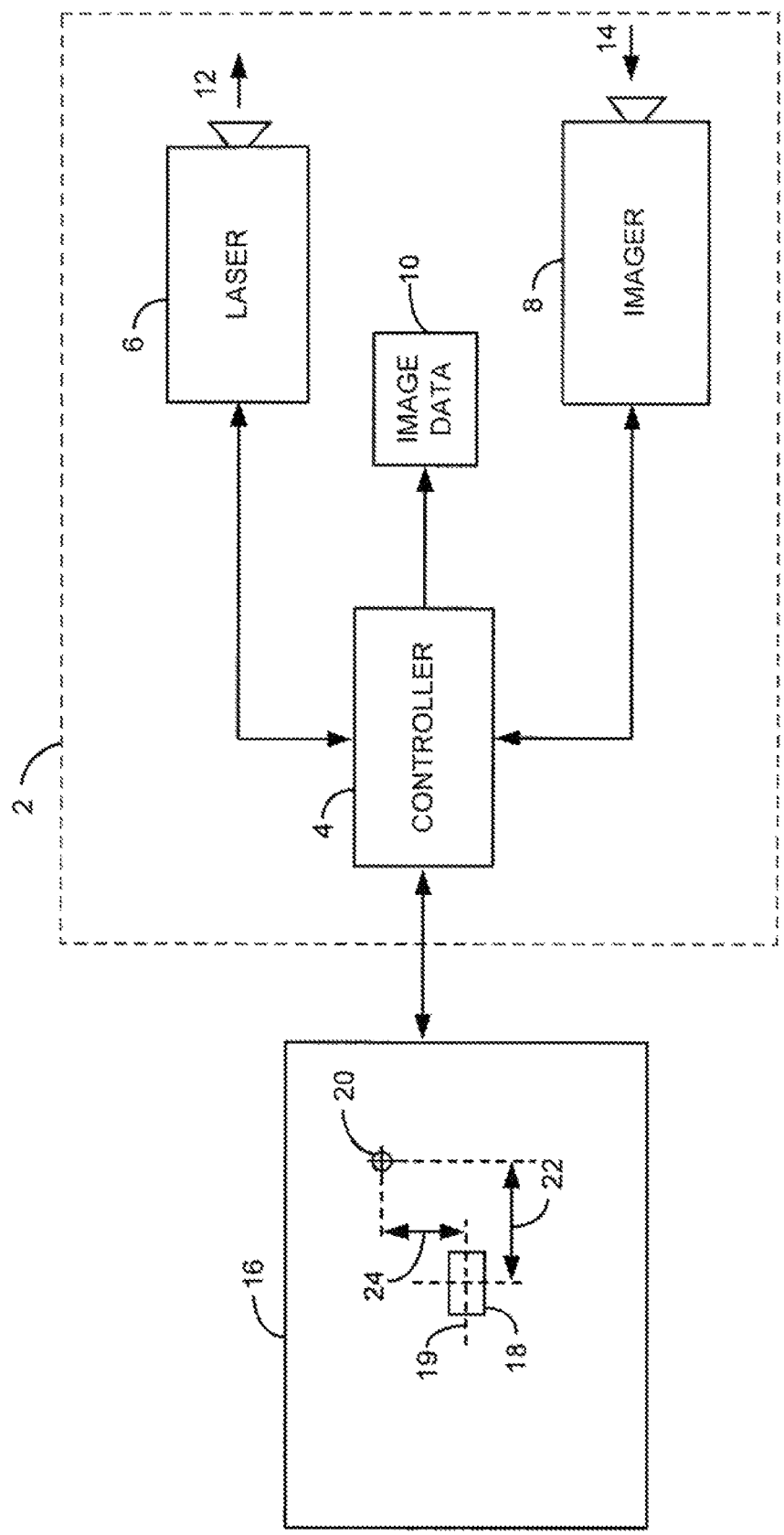
FIG. 1 illustrates an example of an imaging system in accordance with an aspect of the invention.

FIG. 11 illustrates an example of an imaging system 2 in accordance with an aspect of the invention. The imaging system 2 could be implemented, for example, on a mobile unit, such as an aircraft, a boat, or a motor vehicle. Alternatively, the imaging system 2 could be ground implaced for man portable applications. The imaging system 2 can include a controller 4 that controls a laser 6 and an imager 8. The controller 4 could be implemented, for example, as hardware, software or a combination thereof. Additionally, although FIG. 1 illustrates the laser 6 and the imager 8 as separate units, it is to be understood that in alternative embodiments, the laser 6 and the imager 8 could be a single unit. The controller 4 can provide image data 10 as an output. The image data 10 could be stored, for example, in a memory, such as random access memory (RAM), or a hard disk. Additionally or alternatively, the image data 10 could be transmitted via a data link to a remote location. Additionally, the controller 4 can control a display 16 that displays images that characterize the image data 10.

The laser 6 can provide a relatively narrow light beam, referred to as a laser beam, in a direction indicated by arrow 12. The laser 6 could be implemented, for example, as a solid-state laser, a gas laser or a chemical laser. One skilled in the art will appreciate the other types of lasers could also be implemented. The laser beam could be provided at a wavelength in the visible, near infrared (NIR), shortwave infrared (SWIR), midwave infrared (MWIR) or longwave infrared (LWIR) portion of the electromagnetic spectrum, such as about 0.4 micrometers to about 12 micrometers. For purposes of simplification of explanation, in the present example, the laser 6 will be assumed to provide the laser beam at a wavelength of about 1 micrometer. The controller 4 can control the orientation of the system 2, thus changing the direction 12 that the laser 6 provides the laser beam. The orientation of the system 2 could be controlled, for example, by one or more servo motors of a gimbal system that can physically change the line of sight of the laser 6 and the imager 8. Alternatively, the orientation of the system's 2 line of sight could be changed by adjusting the position of one or more mirrors that reflect the laser beam.

The imager 8 can detect an image by receiving one or more photons in a direction indicated by arrow 14. The controller 4 can control the receiving direction 14 of the imager, for example, when the controller 4 changes the system's 2 line of sight. The imager 8 can include a photosensitive device, such as a focal plane array, a charge-coupled device (CCD), one or more photodiodes, one or more phototransistors, one or more photo-resistors, etc. The photosensitive device can detect light for an array of pixels that form an image. As an example, the imager 8 can be configured to detect photons that are emitted in the infrared band of the electromagnetic spectrum. In one embodiment, the imager 8 could be configured to detect light at a wavelength of about 1 to about 5 micrometers. As stated above, laser 6 can provide a laser beam at a wavelength of about 1 micrometer, while the thermal image of the environment could be provided at a wavelength of about 3 to about 5 micrometers. Accordingly, the imager 8 could be configured to detect both, the laser beam provided by the laser 6, as well as a thermal image of the environment. Optionally, the imager 8 could include a dual band rejection filter that can block out a wavelength of about below 0.9 micrometers and about 1.1 to about 2.9 micrometers, such that the imager 8 can detect wavelengths of about 1 micrometer and about 3 to about 5 micrometers. The dual band rejection filter could be implemented, for example as an optical filter (e.g., a lens) or as an electrical filter coupled to the imager 8.

The controller 4 can control an integration time of the imager 8. The integration time can, for example, represent the duration for which the photosensitive device of the imager 8 is permitted to collect photons for each detected image. Varying the integration time of the imager 8 can change the amount of light that the imager 8 detects. Typically, the longer the integration time, the more ambient light is detected by the imager 8. Conversely, the shorter the integration time, the less ambient light (and more directed light) is detected by the imager 8. As an example, the controller 4 can cause the imager 8 to alternate between two different integration times, namely a first integration time and a second integration time. The first integration time can be on the order of about 10 milliseconds, while the second integration time can be on the order of about 50 microseconds.

When the imager 8 is set to the first integration time, the imager 8 can detect an environment image. The environment image can be, for example, a thermal image of an environment within the line-of-sight of the imager 8. Thus, the first integration time can be referred to as an environment integration time. The imager 8 can provide the environment image to the controller 4, such that the controller 4 can capture (e.g., convert to characterising data) the environment image. When the imager 8 is synchronized to a laser pulse of the laser 6 and set to the second (short) integration time, the imager 8 will typically only detect a reflection of the laser beam (referred to as a laser image), since the photosensitive device of the imager 8 is not exposed (to the environment) long enough to detect light radiated from the rest of the environment within the line of sight of the imager 8. Thus, the second integration time can be referred to as a laser integration time. The laser image can be provided to, and captured by, the controller 4.

In one example, the controller 4 can cause the imager 8 to detect 60 images a second. In such a situation, the controller 4 can cause the imager 8 to detect (and provide to the controller 4) 30 environment images in a second, and 30 laser images in a second, alternating between the environment images and the laser images. The controller 4 can examine each of the laser images (up to about 30 frames per second depending on a pulsing frequency of the laser 6 e.g., a laser code) to determine the position of the laser beam relative to the environment. The controller 4 can superimpose the laser image onto a corresponding environment image and provide the superimposed image as image data 10.

The superimposition of a laser image onto the corresponding environment image can be accomplished in a number of different ways. As one example, the controller 4 can analyze each laser image and determine the position of the laser beam relative to the rest of the image by detecting charged pixels of the laser image. In such a situation, the controller 4 could draw (e.g., reconstruct) a laser beam spot 20 or laser marker onto the environment image thus, creating a superimposed image. Alternatively, the controller 4 could merge the laser image and the environment image together to create the superimposed image.

The controller 4 can analyze and display each superimposed image on the display 16 to align the laser 6. As an example, the controller 4 can be programmed to choose a portion of the environment image to be designated as a target 18. Alternatively, the target 18 can be identified by a user of the display 16 by controlling an orientation of crosshairs 19. In such an example, the display 16 could indicate to the controller 4, the location of the target 18 relative to the rest of the superimposed image. The target 18 could be, for example, an environmental structure that radiates sufficient heat that is detectable by the imager 8 during an environment image detection process. The controller 4 can also analyze the position of the laser beam spot 20 on the superimposed image. If a laser beam spot 20 does not overlap with at least a portion of the target 18, the controller 4 can measure horizontal and vertical offsets (indicated as 22 and 24, respectively) between the target 18 and the laser beam spot 20. Based on the horizontal and vertical offsets 22 and 24, the controller 4 can adjust the relative position of the crosshairs 19 and the orientation of system's 2 line of sight such that future superimposed images will include the laser beam spot 20 overlapping the target 18. Additionally or alternatively, system 2 could be configured to adjust the line of sight of the laser 6, relative to the line of sight of the imager 8, such that such that future superimposed images will include the laser beam spot 20 overlapping the target 18.

When the imager 8 is properly aligned with the target 18, a user of the imaging system 2 can activate the system that is associated with the imaging system 2. As an example, if the imaging system 2 is associated with a weapons targeting system, a laser guided weapon (e.g., a laser guided missile, laser guided artillery munitions, laser guided bombs, etc.) can be fired at the target 18. The laser guided weapon, once fired, will track the laser beam until a collision occurs.

Figure 2:
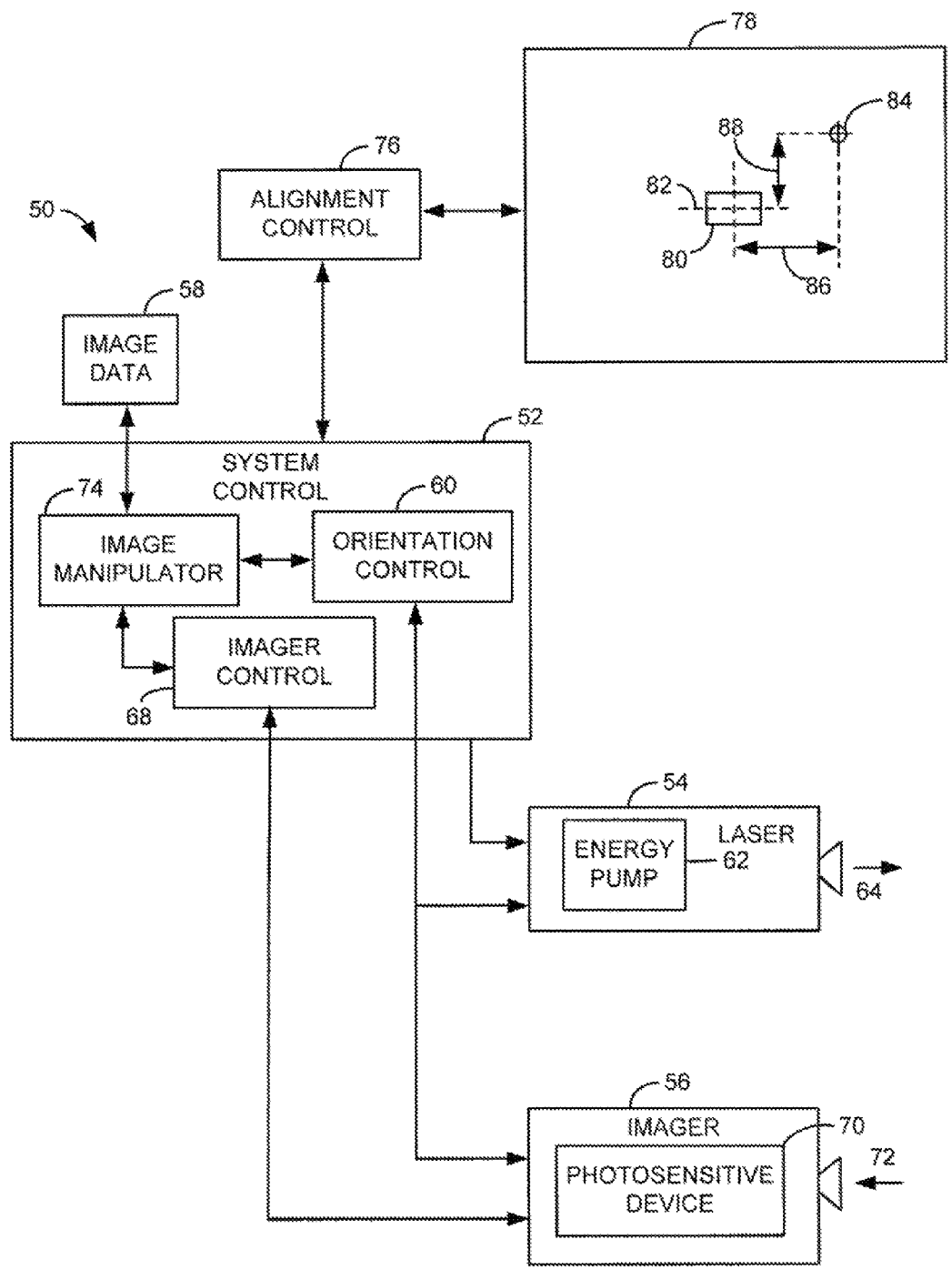
FIG. 2 illustrates another example of an imaging system in accordance with an aspect of the invention.

FIG. 2 illustrates another example of an imaging system 50 in accordance with an aspect of the invention. The imaging system 50 includes a system control 52 that is communicatively coupled to a laser 54 and an imager 56. In FIG. 2, although the laser 54 and the imager 56 are illustrated as separate units; one skilled in the art will appreciate that the laser 54 and the imager 56 could alternatively be constructed as an integrated unit. The system control 52 can be implemented, for example, as hardware, software or a combination thereof. The system control 52 can provide an output as image data 58. The image data 58 can be stored in RAM or a hard disk and/or transmitted via a data link to a remote location. Although FIG. 2 illustrates the image data 58 being external to the system control 52, one skilled in the art will appreciate that image data 58 could be stored in a storage system integrated into the system control 52 or output to a display 78.

The system control 52 can control the laser 54 via an energy pump 62. The laser 54 can be implemented, for example, as a light source that provides a light beam at a relatively narrow projection beam radius, such as about 100 to about 250 microradians, at a wavelength of about 1 micrometer. Control of the energy pump 62 can control a frequency of laser beam pulses that are provided by the laser 54 at a direction indicated by arrow 64. Additionally, the system control 52 can control an orientation of the imaging system 50 via an orientation control 60. The orientation control 60. can include one or more servo motors (such as in a gimbal system) that can physically change the line of sight of the imaging system 50, thereby changing the line of sight of the laser 54 and the imager 56. Alternatively, the orientation control 60 could be implemented as one or more adjustable mirrors that control a reflection of the laser beam.

The system control 52 can also include an imager control 68 that controls the imager 56. The imager 56 can be implemented, for example, as a photosensitive camera, such as a visible, NIR, SWIR, or infrared camera that includes a photosensitive device 70. The photosensitive device 70 can include, for example, a focal plane array, a CCD, one or more photodiodes, one or more phototransistors or one or more photo-resistors. One skilled in the art will appreciate the various components that could be implemented as the photosensitive device 70. As an example, the photosensitive device 70 detects light for an array of pixels that can be aggregated to form a detected image. The imager control 68 can cause the imager 56 to perform an image detection process.

During the image detection process, the imager 56 detects photons radiated to the imager 56 within a specific band of light wavelengths at a direction indicated by arrow 72. In one example, the band can be about 1 to about 5 micrometers, referred to as the detection band. In such a situation, the detection band can be configured with a sufficient bandwidth (e.g., cover enough frequencies) that the imager 56 can detect both the laser beam (or a reflection of the laser beam) provided by the laser 54, and an environment image that corresponds to thermal energy (e.g., infrared light waves at a wavelength of about 3 to about 5 micrometers) radiated from environmental structures within the line of sight of the imager 56. In one embodiment, a filter can be included on the imager 56 to block wavelengths of about below 0.9 micrometers and about 1.1 to about 2.9 micrometers. Such a filter could be implemented, for example as an electrical filer or an optical filter (e.g., in the lens or on the photosensitive device 70).

The imager control 68 can also control an integration time of the photosensitive device 70. Control of the integration time of the photosensitive device 70 can control exposure time (e.g., photon collection time) of the photosensitive device 70 during an image detection process. Changing the integration time of the photosensitive device 70 controls the amount of ambient light that is detected by the photosensitive device 70. The integration time is proportional to the amount of ambient light detected, that is, the longer the integration time, the more ambient light that will be detected by the imager 56 during the image detection process. In one implementation, an integration time of about 10 milliseconds will allow the imager 56 to detect a thermal image of an environment within the line of sight of the imager 56. Conversely, a shorter integration time will reduce the amount of ambient light detected by the photosensitive device 70. If the integration time is sufficiently low (e.g., 50 microseconds) the imager 56 will only detect a relatively bright source of light (e.g., a reflection of a laser beam) that is within the line of sight and the bandwidth of the imager 56.

An alignment control 76 can provide instructions to the system control 52. The alignment control 76 can be implemented, for example, as a part of one or more external systems, such as a boresight targeting system. Although the alignment control 76 is shown to be a separate unit from the system control 52, one skilled in the art will appreciate that the system control 52 and the alignment control 76 could be an integrated unit. As an example, the alignment control 76 can provide instructions to the system control 52 that causes the system control 52 to execute a laser alignment process. In such an alignment process, the imager control 68 causes the imager 56 to detect images at a rate of about 60 images per second. One skilled in the art will appreciate that the image detection rate can be more or less based on the design of the imaging system 50. During the alignment process, the orientation control 60 can cause the imaging system 50 to change its line of sight to place the laser output 64 on a targeted structure.

Additionally, during the alignment process, the imager control 68 can cause the imager 56 to alternate the integration time for each detected image between an environment image integration time and a laser image integration time. In one example, the environment image integration time can correspond to an integration time of about 10 milliseconds, while the laser image integration time can correspond to a time of about 50 microseconds. Such a change in the integration time will cause the imager 56 to alternate between detecting an environment image, and a laser image, as discussed above. Additionally, the system control 52 can synchronize the laser 54 with the imager 56, such that the laser 54 provides one or more laser pulses while the imager 56 is detecting the laser images. The detected images can be provided to the imager control 68. In the present example, the imager 56 will provide about 30 environment images and up to about 30 laser images per second (depending on the pulsing frequency of the laser 54, e.g., a laser code) to the imager control 68, wherein the provided images are interleaved and alternate between an environment image and a laser image.

The imager control 68 can capture (e.g., convert to characterizing data) the images received from the imager 56, and provide the received images to an image manipulator 74. The image manipulator 74 examines each environment image and each laser image. Typically, the laser image will include only a small group of pixels that represent the detected laser beam, and virtually no other image will be detected. The small group of pixels that represent the laser beam can be referred to as a laser spot. The image manipulator 74 can determine the location of the laser spot in each laser image. The image manipulator 74 can then superimpose the laser spot or a marker at the same (or nearly the same) location on a preceding or proceeding environment image to form a superimposed image. The image manipulator 74 can continue this process for all other received images. The superimposed images can be provided as image data 58 and the superimposed images can be displayed on a display 78.

The image manipulator 74 can be programmed to examine the superimposed images to adjust the orientation of the imaging system 50 and to provide the alignment control 76 with the superimposed images that can be displayed on the display 78. The superimposed images can be analyzed, by either the image manipulator 74, or a user of the display 78 to determine a location of a target 80. In one example, the target 80 can correspond to a physical structure that radiated sufficient thermal energy (e.g., infrared light) or reflected energy (visible, NIR, SWIR light) to be detected by the imager 56 on an environment image. The target 80 can be tracked by an algorithm, or the target can be tracked by the user, such that the alignment control 76 transmits instructions to the system control 52 to track the target 80 displayed on the display 78. The image manipulator 74 can also change a relative position of a target identifier, such as a recticle 82.

In one example, the display 78 could be implemented as part of a boresight targeting system on which the superimposed images (transmitted by the alignment control 76) are displayed. Such a display could include an adjustable target position (e.g., recticle 82) that can correspond to a desired orientation for the laser 54. The location of the target 80 could thus be transmitted to the system control 52 via the alignment control 76.

Once the target 80 is identified, the image manipulator 74 can determine the position of a laser spot 84 on the superimposed image relative to the identified target 80. Additionally or alternatively, the user of the display 78 could identify the location of the laser spot 84 through the boresight targeting system. In such an implementation, alignment control can provide the system control 52 with the location of the laser spot 84, relative to the target 80. The image manipulator 74 can calculate horizontal and vertical offsets, indicated at 86 and 88, respectively, between the laser spot 84 and the target 80 and provide this information to the system control 52. The system control 52 can examine the received information and determine if an adjustment of the system's 50 orientation is necessary. An adjustment can be necessary when, for example, at least one of the horizontal and vertical offsets 84 and 86 received by the control 60 are greater than zero. This condition can exist when the laser spot 84 does not overlap the target 80. The image manipulator 74 and the orientation control 60 can adjust the relative position of the recticle 82 and the line of sight of the imaging system 50 to reduce the horizontal and/or vertical offsets 86 and 88 to at or near zero, such that in future superimposed images, the laser spot 84 will overlap the target 80. In one embodiment, the imaging system 50 can be manually adjusted by the user of the display 78. Alternatively, adjustment of the imaging system 50 can be autonomous.

When the laser 54 is properly aligned with the target 80, a user of the imaging system 50 can activate the system that is associated with the system control 52. As an example, if the system control 52 is associated with a weapons targeting system, a laser guided weapon (e.g., a laser guided missile, a laser guided smart bomb etc.) can be fired at the target 80. At or near the same time, the laser beam can be fired at the target 80. The laser guided weapon, once fired, will track the laser beam until a collision occurs.

Figure 3:
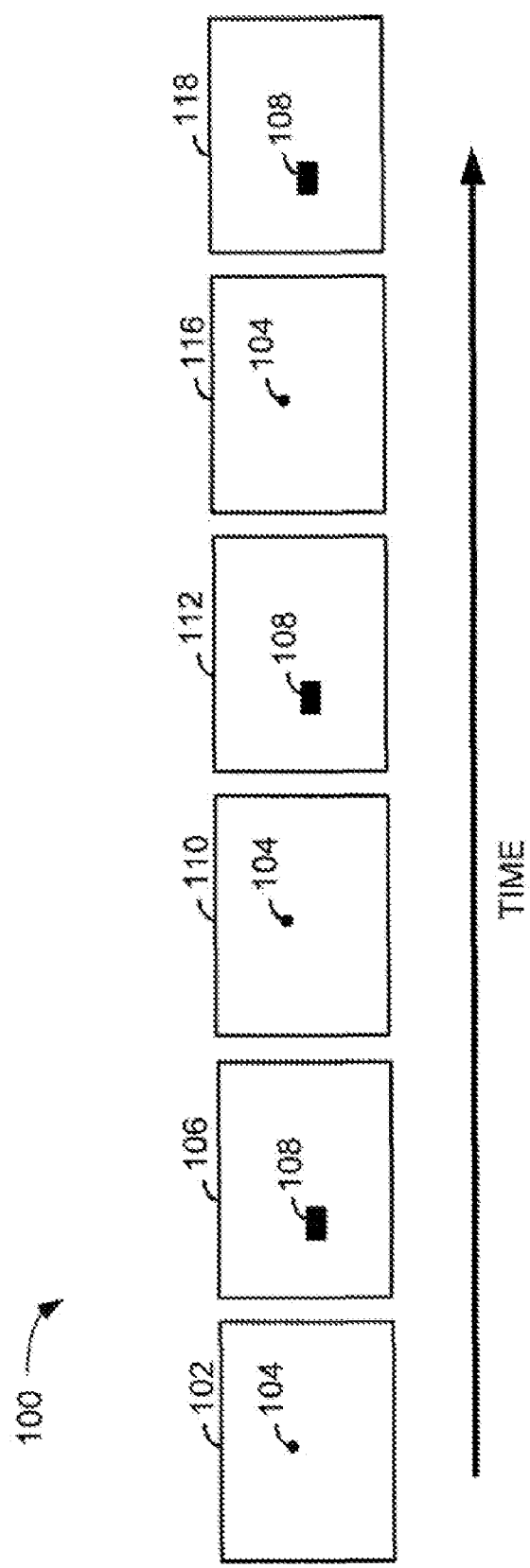
FIG. 3 illustrates an example of an image array in accordance with an aspect of the invention.

FIG. 3 illustrates an example of an image array 100 detected by the imager 56 and captured by the imager control 68 illustrated in FIG. 2. The images can be provided to the image manipulator 74 in sequential order, as indicated by the TIME arrow. The image array 100 includes a plurality of laser images 102, 110 and 116. The laser images 102, 110 and 116 can correspond to a detected laser image, as discussed above. The laser images 102, 110 and 116 can include, for example, a laser spot 104. Interleaved between the laser images 102, 110 and 116 can be environment images 106, 112 and 118. The environment images 106, 112 and 118 can include a thermal image of a physical structure, indicated at 108. The image array 100 can be provided to the image manipulator 74 at a rate of about 60 frames per second (e.g., 60 Hz), such that the illustrated image array 100 can be provided to the image manipulator 74 in about 0.1 seconds. One skilled in the art will appreciate that that alternate interleaving ratios could be used including only laser images. The later would be used to preboresight the system before target engagement.

Figure 4:
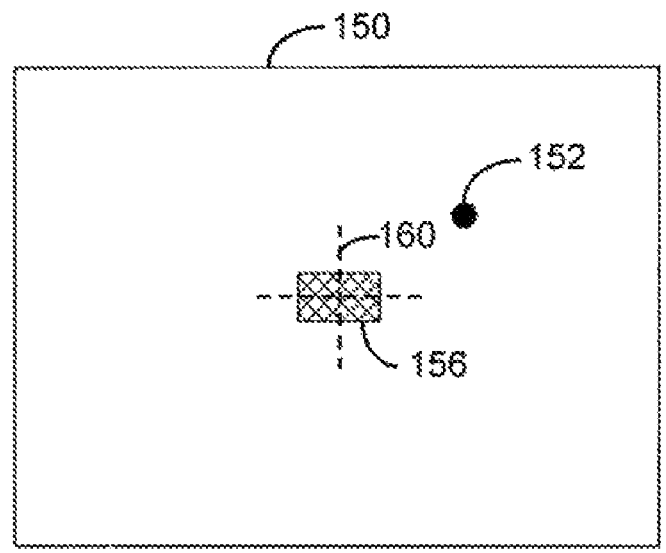
FIG. 4 illustrates an example of a superimposed image in accordance with an aspect of the invention.

FIG. 4 illustrates an example of a superimposed image 150 produced by the image manipulator 74 illustrated in FIG. 2. The superimposed image 150 includes a laser spot 152, a target 156 and a recticle 160. As discussed above with respect to FIG. 2, the image manipulator 74 can determine the vertical and horizontal offsets between the laser spot 152 and the target 156 and provide the offsets to the orientation control 60.

Figure 5:
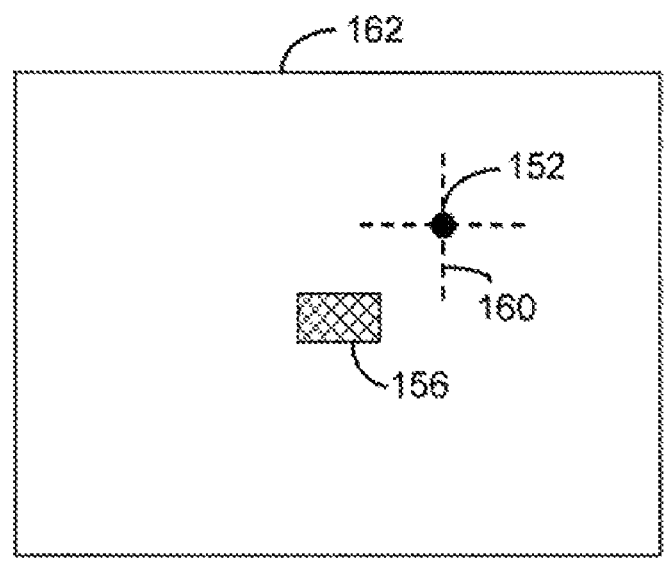
FIG. 5 illustrates another example of a superimposed image in accordance with an aspect of the invention.

FIG. 5 illustrates an example of a superimposed image 162 produced by the image manipulator 74 illustrated in FIG. 2. The superimposed image 162 includes a target 156 wherein an image manipulator 74 has adjusted a relative position of a recticle 160 such that the recticle 160 overlaps a laser spot 152. The orientation of the imaging system 50 needs to be adjusted such that the recticle 160 and the laser spot 152 overlap the target 156.

Figure 6:
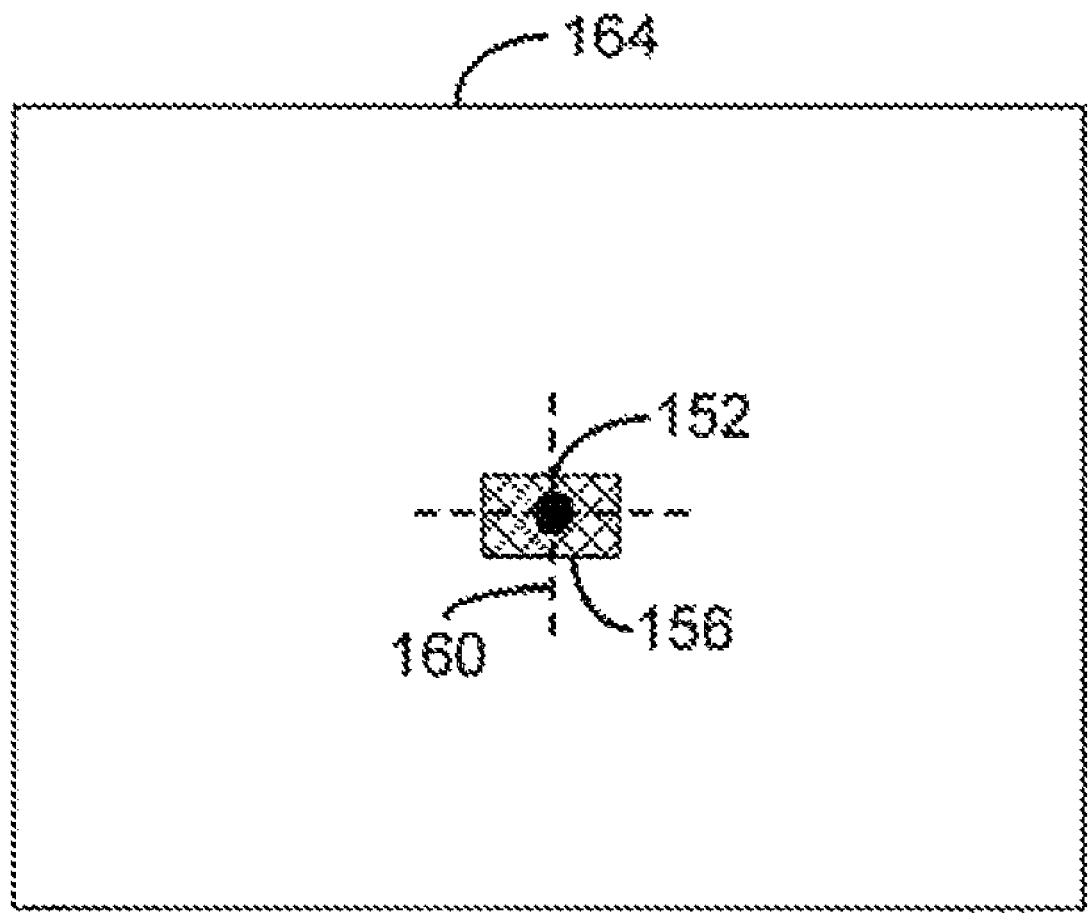
FIG. 6 illustrates yet another example of a superimposed image in accordance with an aspect of the invention.

FIG. 6 illustrates an example of a superimposed image 160 wherein an imaging system 50 has been aligned and a laser spot 152 now overlaps a target 156 and a recticle 160 produced by the image manipulator 74 illustrated in FIG. 2. Since the laser spot 152 overlaps the target 156 and the recticle 160, no further alignment of the imaging system 50 is needed.

Figure 7:
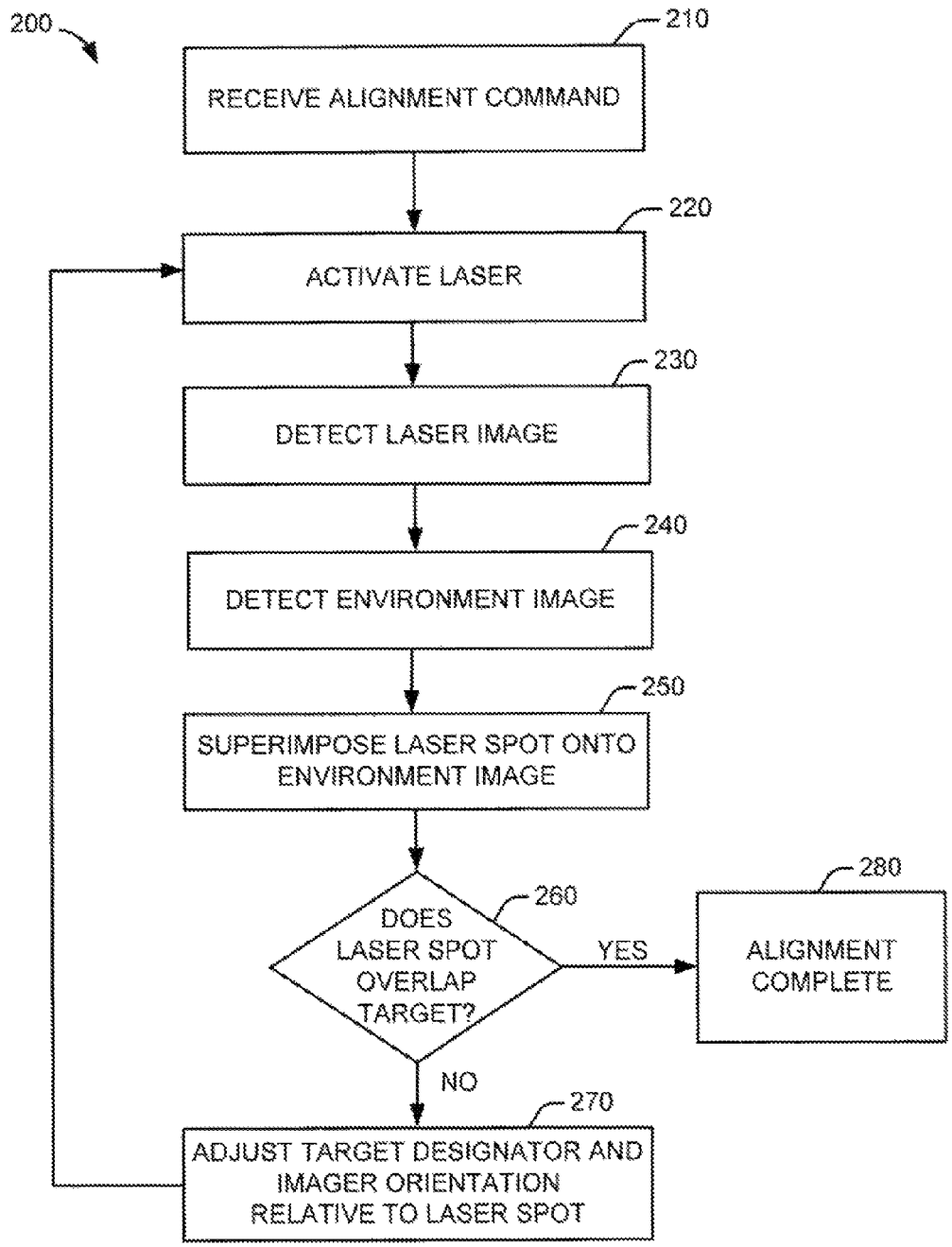
FIG. 7 illustrates a flow chart of a process of an imaging system in accordance with an aspect of the invention.

FIG. 7 illustrates a flow chart of a process 200 for aligning an imaging system. It is to be understood and appreciated that the illustrated actions, in other embodiments, may occur in different orders and/or concurrently with other actions. Moreover, not all illustrated features may be required to implement a process. The imaging system could be associated with a laser guided system, such as a laser guided weapons system. At 210, an alignment command is received. The alignment command could be executed based on a timer, or could be received by the imaging system from an external source. The process proceeds to 220.

At 220 a laser is activated by a controller. Activation of the laser causes a laser beam to be provided in a specific direction, the direction is dictated by the orientation of the laser. The process proceeds to 230. At 230 the controller causes an imager to detect a laser image. The imager can include, for example, a photosensitive device, such as a focal plane array or a CCD capable of detecting light that is propagated at a wavelength of about 1 to about 5 micrometers. To insure detection of the laser image, the imager can be set to an integration time of about 50 microseconds and synchronized with the laser pulse, and the image is provided to, and captured by the controller. The laser image includes a laser spot that corresponds to the laser beam. The laser image can be provided to the controller. The process proceeds to 240.

At 240, an environment image is detected by the imager, and captured by the controller. To detect the environment image, the imager can be set to an integration time of about 10 milliseconds. The process proceeds to 250. At 250, the controller manipulates the laser image and the environment image, to form a superimposed image such that the superimposed image includes images captured in the environment image (including a target) and the laser spot. The process proceeds to 260.

At 260, a determination is made as to whether the laser spot overlaps the target in the superimposed image. If the determination at 260 is negative (e.g., NO), the process proceeds to 270. At 270, vertical and horizontal offsets between the laser spot and the target are examined by the controller. The controller adjusts a target designator's (e.g., recticle) orientation and an imager's orientation relative to the laser to reduce both the horizontal and vertical offsets to about zero and the process returns to 220. If the determination at 260 is affirmative (e.g., YES), the process proceeds to 280. At 280, the alignment of the imaging system is complete.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An image detections system comprising:
   an image detection system configured to detect images; and
   a controller configured to:
      synchronize the image detection system to capture a laser spot corresponding to a reflected laser beam over a first integration time and to capture an environment image detected by the image detection system over a second integration time that is greater than the first integration time;
      generate a superimposed image that includes one of a marker and a light beam spot superimposed at a location of the captured laser spot relative to the captured environment image onto the captured environment image;
      provide output data to a display that displays the superimposed image, such that a location of the light beam relative to an object within the environment image can be determined;
      determine an alignment offset of a center point of the object in the superimposed image relative to the captured laser spot; and
      move at least a portion of the image detection system to mitigate the alignment offset.

2. The system of claim 1, wherein the controller is configured to capture detected images over the first integration time for each of a first plurality of frames and capture detected images over the second integration time for each of a second plurality of frames.

3. The system of claim 2, wherein the controller alternates between capturing detected images over the first integration time and the second integration time every captured frame.

4. The system of claim 1, wherein the second integration time is about 50 to about 200 times greater than the first integration time.

5. The system of claim 1, wherein the first integration time is about 2 to about 20 milliseconds, and the second integration time is about 10 to about 100 microseconds.

6. The system of claim 1, wherein the image detection system includes a filter that passes light at wavelengths of about 1 to about 5 micrometers.

7. The system of claim 6, wherein the image detection system includes a filter that passes light between about 0.9 and about 1.1 micrometers and between about 3 to about 5 micrometers.

8. An image detections system comprising:
   an image detection system configured to detect images; and
   a controller configured to:
      synchronized the image detection system to capture a laser spot corresponding to a reflected laser beam over a first integration time and to capture an environment image detected by the image detection system over a second integration time that is greater than the first integration time; and
      provided output data to a display that displays alternating captured frames of the captured laser spot and the captured detected environment image, such that the laser spot appears to be superimposed onto the detected environment image at a location of the captured laser spot relative to the captured environment image.

9. A system for detecting an image, the system comprising:
   means for detecting images;
   means for capturing the detected image;
   means for setting an integration time of the means for detecting images, such that a laser beam image is captured by the means for capturing after a first integration time and an environment image is captured after a second integration time that is greater than the first integration time; and
   means for superimposing the laser beam image onto the environment image to form a superimposed image, the means for superimposing comprising:
      means for identifying a location of a first laser spot in the laser beam image; and
      means for providing a second laser spot onto the environment image at the identified location of the first laser spot.

10. The system of claim 9, further comprising means for detecting an alignment offset between the second laser spot and a target within the superimposed image.

11. The system of claim 10, further comprising means for moving at least a portion of the system to mitigate the alignment offset.

12. The system of claim 9, wherein the means for detecting images further comprises means for filtering light at wavelengths outside the wavelengths of the laser beam and outside the wavelengths of the environment image.

13. A method for detecting an image comprising:
   providing a light beam from a laser;
   detecting an image of an environment with an imager set to a first integration time;
   detecting an image of the light beam with the imager set to a second integration time;
   superimposing at least a portion of the image of the light beam onto the image of the environment to form a superimposed image, wherein the superimposing comprises:
      detecting a location of a laser spot image in the image of the light beam; and
      providing the laser spot image onto the environment image at the detected location;
   identifying, by a controller, a target on the superimposed image;
   calculating, by the controller, an offset between the laser spot and the target on the superimposed image; and
   adjusting, by the controller, an orientation of the laser based on the calculated offset.

14. The method of claim 13, wherein the first integration time is about 2 to about 20 milliseconds, and the second integration time is about 10 to about 100 microseconds.

15. The method of claim 13, wherein detecting an image of an environment and detecting an image of the light beam is alternated each captured frame.

* * * * *